US010013403B2

United States Patent
Masuko

(10) Patent No.: US 10,013,403 B2
(45) Date of Patent: Jul. 3, 2018

(54) BROWSING SYSTEM, TERMINAL, IMAGE SERVER, PROGRAM, COMPUTER-READABLE RECORDING MEDIUM STORING PROGRAM, AND METHOD

(71) Applicant: Rakuten, Inc., Shinagawa-ku, Tokyo (JP)

(72) Inventor: Soh Masuko, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 242 days.

(21) Appl. No.: 14/595,809

(22) Filed: Jan. 13, 2015

(65) Prior Publication Data

US 2015/0128015 A1    May 7, 2015

Related U.S. Application Data

(63) Continuation of application No. 14/114,101, filed as application No. PCT/JP2012/061410 on Apr. 27, 2012.

(30) Foreign Application Priority Data

Apr. 28, 2011    (JP) .................. 2011-102524

(51) Int. Cl.
   *G06F 17/00*   (2006.01)
   *G06F 17/22*   (2006.01)
   (Continued)

(52) U.S. Cl.
   CPC ...... *G06F 17/2264* (2013.01); *G06F 17/2247* (2013.01); *G06F 17/241* (2013.01); *G06F 17/289* (2013.01); *G06F 17/30905* (2013.01)

(58) Field of Classification Search
   CPC ....................................... G06F 17/289
   See application file for complete search history.

(56) References Cited

U.S. PATENT DOCUMENTS 6,957,231 B1* 10/2005 Lubbers ................ G06F 17/218
8,144,990 B2*  3/2012 Englund ............... G06F 17/289
                                                              382/181

(Continued)

FOREIGN PATENT DOCUMENTS

JP    2002-108854 A    4/2002
JP    2002-157498 A    5/2002

(Continued)

OTHER PUBLICATIONS

International Search Report of PCT/JP2012/061410, dated Jun. 26, 2013.

(Continued)

*Primary Examiner* — Scott Baderman
*Assistant Examiner* — Benjamin J Smith
(74) *Attorney, Agent, or Firm* — Sughrue Mion, PLLC

(57) ABSTRACT

A browsing system (1) comprises a terminal (100) for extracting additional information specifying characters or character strings that should be added to an image, from a document or text character strings that are to be transformed contained in a program specified by that document. In addition, the browsing system (1) comprises an image server (200) that receives an image request and sends as an image response an image to which are added characters or character strings specified by the additional information designated by an image parameter specified in the received image request.

10 Claims, 18 Drawing Sheets

(51) Int. Cl.
*G06F 17/28* (2006.01)
*G06F 17/30* (2006.01)
*G06F 17/24* (2006.01)

(56) References Cited

U.S. PATENT DOCUMENTS

| | | | | |
|---|---|---|---|---|
| 2001/0044809 A1* | 11/2001 | Parasnis | G06F 17/2205 | 715/201 |
| 2003/0115552 A1* | 6/2003 | Jahnke | G06F 9/454 | 715/201 |
| 2003/0182453 A1* | 9/2003 | Kim | G06F 17/30905 | 709/246 |
| 2003/0208563 A1* | 11/2003 | Acree | H04L 67/16 | 709/219 |
| 2004/0167768 A1* | 8/2004 | Travieso | G06F 17/289 | 704/2 |
| 2004/0260535 A1* | 12/2004 | Chen | G06F 9/543 | 704/9 |
| 2004/0267867 A1* | 12/2004 | Christian | H04L 29/06 | 709/200 |
| 2006/0181631 A1* | 8/2006 | Suzuki | G11B 19/025 | 348/333.02 |
| 2006/0200766 A1* | 9/2006 | Lakritz | G06F 15/00 | 715/234 |
| 2007/0171464 A1* | 7/2007 | Nakajima | G06F 3/1208 | 358/1.15 |
| 2008/0040094 A1* | 2/2008 | Wolgemuth | G06F 17/289 | 704/2 |
| 2008/0082317 A1* | 4/2008 | Rosart | G06F 17/211 | 704/8 |
| 2008/0233980 A1* | 9/2008 | Englund | G06F 17/289 | 455/466 |
| 2009/0125544 A1* | 5/2009 | Brindley | G06F 17/30038 | |
| 2009/0192783 A1* | 7/2009 | Jurach, Jr. | G06F 17/2827 | 704/4 |
| 2010/0329573 A1* | 12/2010 | Tsujino | G06K 9/00463 | 382/209 |
| 2012/0016655 A1* | 1/2012 | Travieso | G06F 17/2827 | 704/2 |
| 2012/0016656 A1* | 1/2012 | Travieso | G06F 17/2827 | 704/2 |
| 2012/0240039 A1* | 9/2012 | Walker | G06F 17/2836 | 715/265 |
| 2013/0124598 A1* | 5/2013 | Lakritz | G06F 17/289 | 709/201 |
| 2013/0124986 A1* | 5/2013 | Lakritz | G06F 17/289 | 715/264 |
| 2013/0124987 A1* | 5/2013 | Lakritz | G06F 17/289 | 715/264 |
| 2013/0132825 A1* | 5/2013 | Masuko | G06F 17/211 | 715/236 |
| 2015/0324336 A1* | 11/2015 | Glezos | G06F 17/2247 | 715/234 |

FOREIGN PATENT DOCUMENTS

| | | |
|---|---|---|
| JP | 2010-141545 A | 6/2010 |
| JP | 4658236 B1 | 3/2011 |
| KR | 20100045336 A | 5/2010 |

OTHER PUBLICATIONS

Akihiko Namikata, "2010 Nen e Muketa Shin Denshi Jichitai no Chosen", Gekkan Jido Ninshiki, 2009, pp. 74-77, vol. 22, No. 5.

Linker, "Dai 19 Kai Hyogenryoku ni Sa o Tsukeyo! Web Design Style Up Tips", Web Creators, Feb. 1, 2010, pp. 72-75, vol. 98.

* cited by examiner

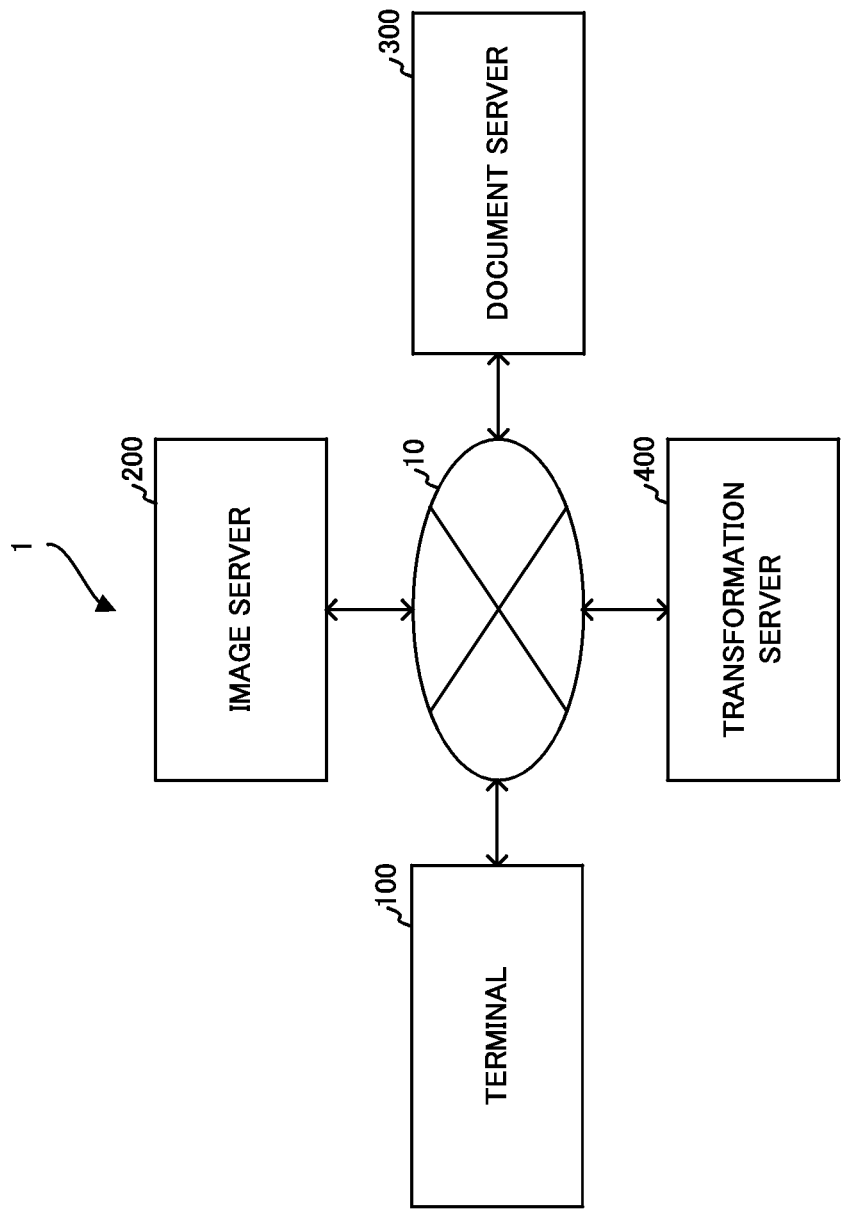

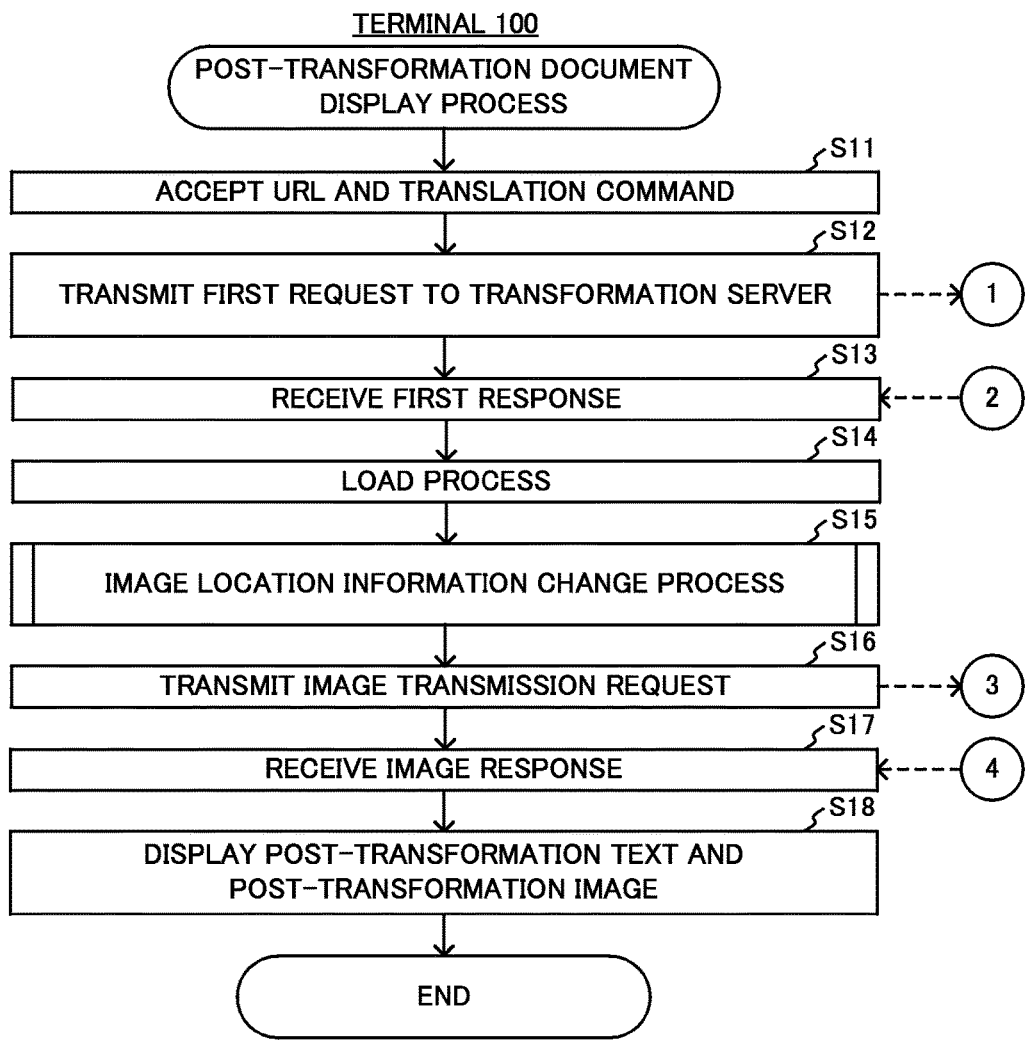

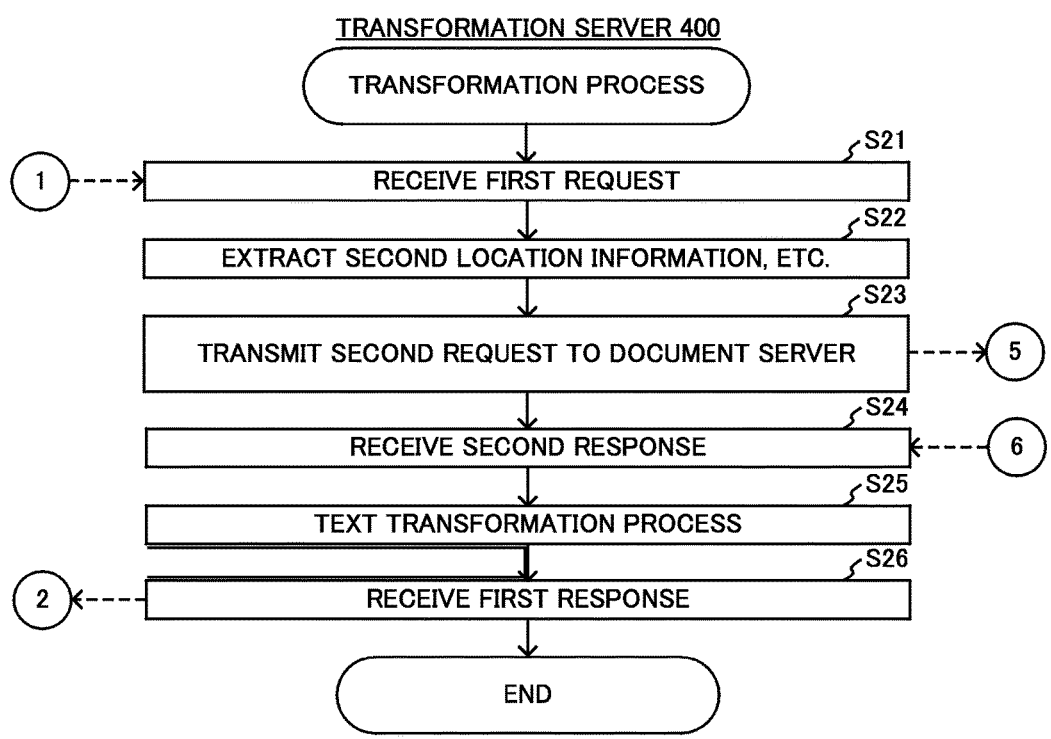

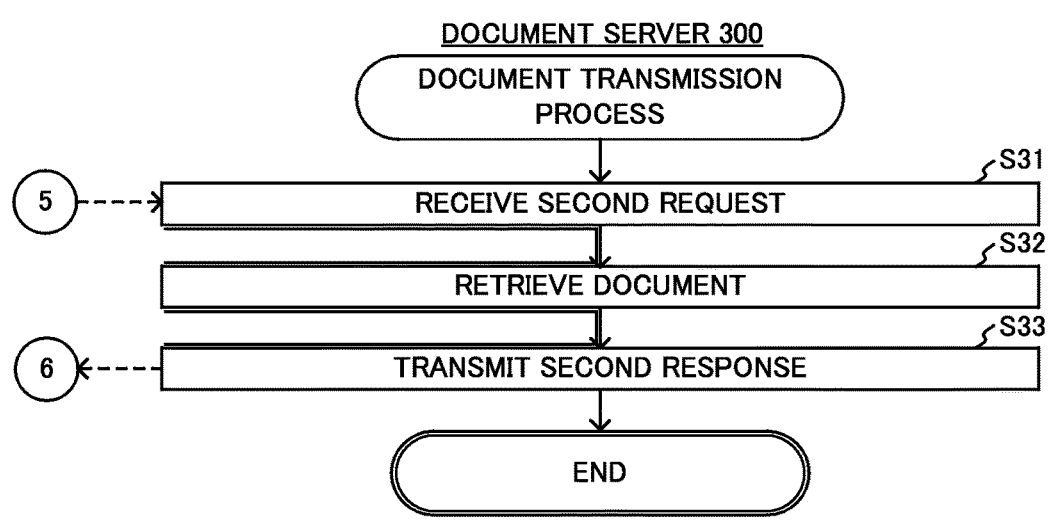

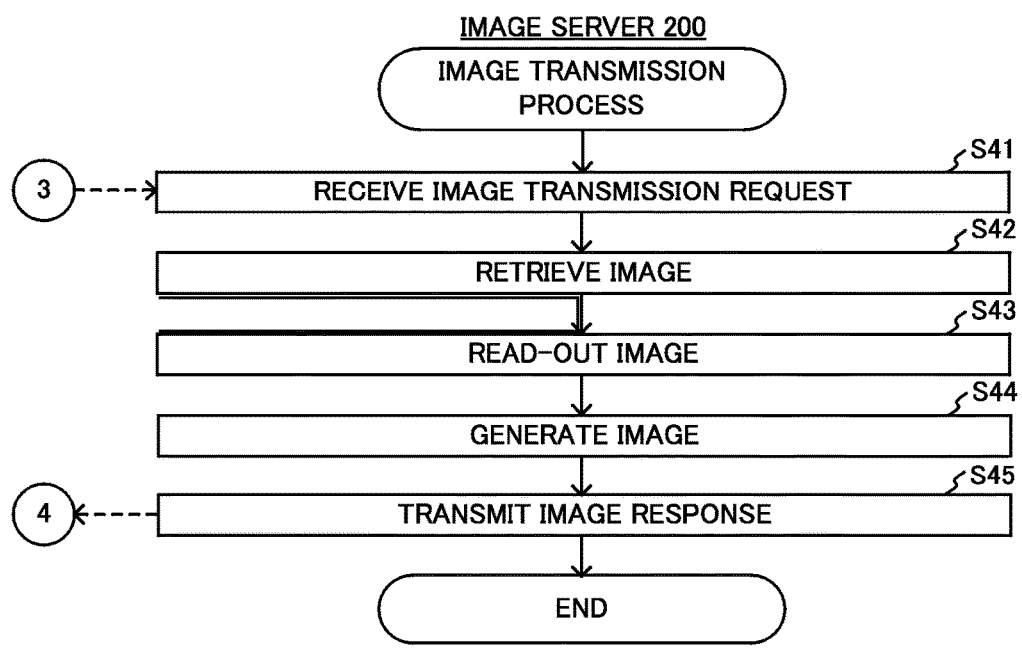

FIG.6A

```
<html>
<head>
<title></title>
<meta http-equiv="Content-Type" content="text/html; charset=UTF-8">
<meta http-equiv="Content-Language" content="ja">
<script type = "text/javascript">
```
FCI → `function transText(){`
```
        var img = document.getElementById("testImg");
        var text = document.getElementById("testImg").alt;
        img.src = "http://www.imageserver/imgtest.php?bkimg=bk1.jpg&setstring="+text;
      }
</script>
</head>
```
BDI → `<body onload="transText()">`
            `Sale<br>`
IMI → `<img src="./img.gif" id="testImg" alt="Lady's Outlet"><br>`
            `Price $4.95<br>`
            `This Lip Rouge in a variety of deep rich colors is specially formulated to offer even coverage with a creamy texture···<br>`
        `</body>`
`</html>`

FIG.6B

```
<html>
<head>
<title></title>
<meta http-equiv="Content-Type" content="text/html; charset=UTF-8">
<meta http-equiv="Content-Language" content="ja">
<script type = "text/javascript">
```
FCI → `function transText(){`
```
        var img = document.getElementById("testImg");
        var text = document.getElementById("testImg").alt;
        img.src = "http://www.imageserver/imgtest.php?bkimg=bk1.jpg&setstring="+text;
            }
</script>
</head>
```
BDI → `<body onload="transText()">`
`セール<br>`
IMO → `<img src="./img.gif" id="testImg" alt="レディースアウトレット"><br>`
`価格 4.95ドル<br>`
`この口紅は、深く豊かなさまざまな色があり、クリーミーな質感で均一に塗`
`れ・・・<br>`
`</body>`
`</html>`

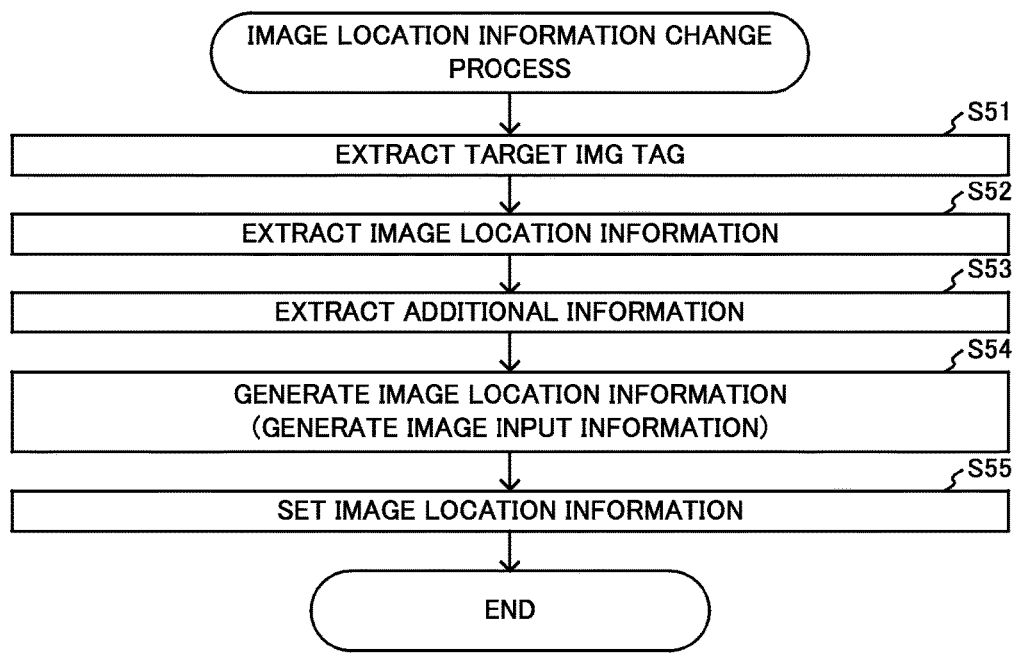

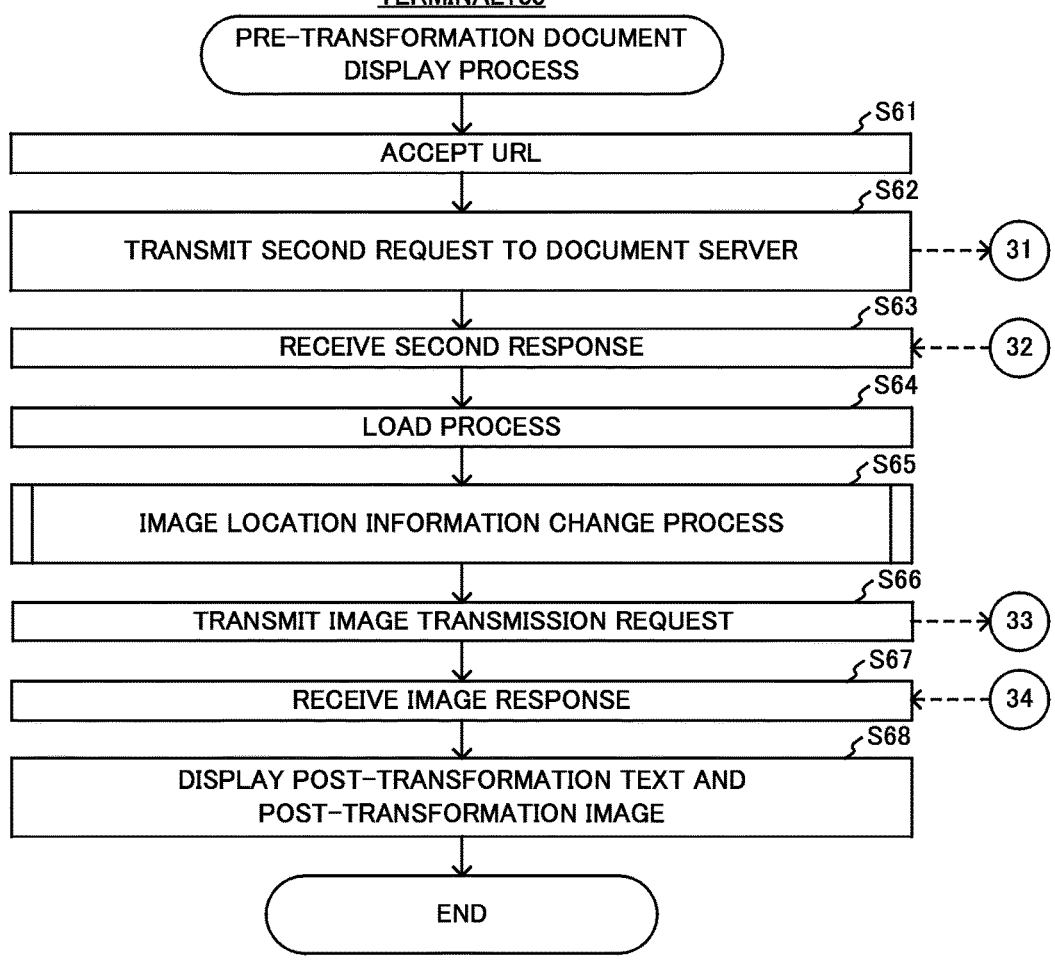

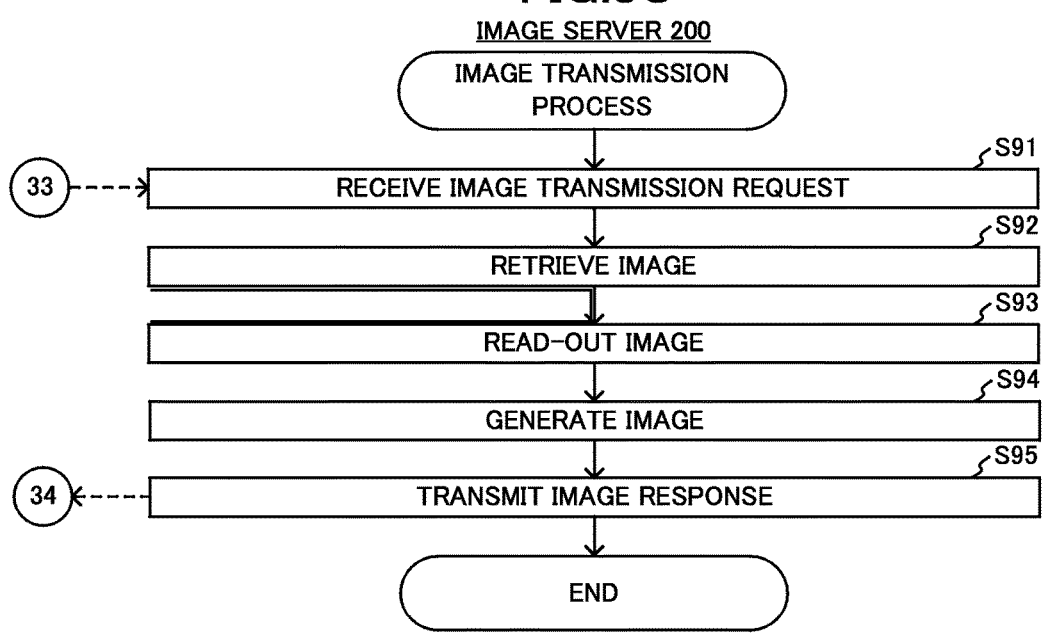

BROWSING SYSTEM, TERMINAL, IMAGE SERVER, PROGRAM, COMPUTER-READABLE RECORDING MEDIUM STORING PROGRAM, AND METHOD

TECHNICAL FIELD

The present invention relates to a browsing system, terminal, image server, program, computer-readable recording medium storing a program, and a method.

BACKGROUND ART

A banner system has been known from before such that after a banner selection request is received when displaying a Web page, when banner data generated in response to that request is received, a banner is displayed on that Web page based on that banner data (for example, see Patent Literature 1).

PRIOR ART LITERATURE

Patent Literature

Patent Literature 1: Unexamined Japanese Patent Application Kokai Publication No. 2002-157498.

DISCLOSURE OF THE INVENTION

Problem to be Solved by the Invention

With the art of Patent Literature 1, the problem exists that, for example, when undertaking a transformation such as a translation, for example of a Web page and/or the like, character strings comprising text contained in the document are transformed, but characters or character strings displayed as images such as banners contained in that document (characters or character strings that are integrated within images) are not transformed.

The present invention was made in view of such a problem and has an objective of eliminating the defect of characters or character strings displayed as images not being transformed when undertaking a transformation such as translation and/or the like.

Means for Solving the Problem

In order to achieve the above object, the browsing system according to a first aspect of the present invention is a browsing system comprising a terminal for displaying text character strings of a document and an image acquired based on image location information contained in that document, and an image server for receiving an image request and transmitting a corresponding image response to a transmission source of that image request, wherein (A) the Terminal Comprises:

an additional information extraction part for extracting additional information specifying characters or character strings that should be added to an image whose location is indicated by the image location information contained in the document, from text character strings to be transformed that are contained in the document or a program specified by the document;

an image location information generation part for generating new image location information specifying the image server as a request destination and specifying an image parameter that designates the extracted additional information; and, an overwriting part for overwriting the image location information associated with the extracted additional information in the document with the new image location information generated; and (B) the Image Server Comprises:

an image generation part for generating an image to which are added characters or character strings specified by additional information designated by an image parameter specified in the image request, being an image transmitted to the terminal as an image response corresponding to the image request specifying the image parameter specified in the new image location information and transmitted from the terminal.

In addition, the browsing system according to the first aspect may be such that:

background information identifying a background image is described on the document or the program specified by the document;

the image location information generation part of the terminal generates new image location information further specifying a background parameter designating the background information; and the image generation part of the image server generates an image in which characters or character strings specified by the additional information designated by the image parameter are added to a background image identified by the background information designated by the background parameter.

In addition, the browsing system according to the first aspect may be such that:

style information indicating a style with which the characters or character strings specified by the additional information are added to an image is described on the document or the program specified by the document;

the image location information generation part of the terminal generates new image location information further specifying a style parameter designating the style information; and the image generation part of the image server generates an image to which characters or character strings specified by additional information designated by the image parameter are added to a background image identified by background information designated by the background parameter, with the style designated by the style parameter.

In addition, the browsing system according to the first aspect may be such that:

image location information prior to being overwritten by the overwriting part of the terminal contains background information identifying a background image;

the image location information generation part of the terminal generates new image location information containing background information contained in the image location information prior to being overwritten; and the image generation part of the image server generates an image to which characters or character strings specified by additional information designated by the image parameter specified in the image request in which the background information contained in the new image location information is further specified, are added to a background image identified by the background information.

In addition, the browsing system according to the first aspect may be such that:

the document is written in HTML (HyperText Markup Language);

a program specified in that document is indicated by an onload attribute of a body tag;

image location information contained in the document is indicated by an src attribute of an img tag; and additional information associated with that image location information is indicated by an alt attribute of that img tag.

In addition, the browsing system according to the first aspect may be such that:

the document is written in HTML (HyperText Markup Language);

a program specified in that document is indicated by an onload attribute of a body tag;

image location information contained in the document is indicated by an src attribute of an img tag; and additional information associated with that image location information is described by text surrounded by tags having a class attribute or an id attribute associated with the img tag.

In order to achieve the above object, the method according to a second aspect of the present invention is a browsing method executed by a browsing system comprising a terminal for displaying text character strings of a document and an image acquired based on image location information contained in that document, and an image server for receiving an image request and transmitting a corresponding image response to a transmission source of that image request, this browsing method including:

an additional information extraction step in which the terminal extracts additional information specifying characters or character strings that should be added to an image whose location is indicated by the image location information contained in the document, from text character strings to be transformed that are contained in the document or a program specified by the document;

an image location information generation step in which the terminal generates new image location information specifying the image server as a request destination and specifying an image parameter that designates the extracted additional information; and, an overwriting step in which the terminal overwrites the image location information associated with the extract additional information in the document with the new image location information generated; and an image generation step in which the image server generates an image to which are added characters or character strings specified by additional information designated by an image parameter specified in the image request, being an image transmitted to the terminal as an image response corresponding to the image request specifying the image parameter specified in the new image location information and transmitted from the terminal.

In order to achieve the above object, the terminal according to a third aspect of the present invention is a terminal for displaying text character strings of a document and an image acquired based on image location information contained in that document, this terminal comprising:

an additional information extraction part for extracting additional information specifying characters or character strings that should be added to an image whose location is indicated by the image location information contained in the document, from text character strings to be transformed that are contained in the document or a program specified by the document;

an image location information generation part for generating new image location information specifying the image server as a request destination and specifying an image parameter that designates the extracted additional information;

an overwriting part for overwriting the image location information associated with the extracted additional information in the document with the new image location information generated; and an image request transmission part for transmitting image requests specified by the image parameter specified in the new image location information.

In order to achieve the above object, the program according to a fourth aspect of the present invention is a program executed by a computer for displaying text character strings of a document and an image acquired based on image location information contained in that document before acquiring this image, the program being specified by the document and causing the computer to function as:

an additional information extraction part for extracting additional information specifying characters or character strings that should be added to an image whose location is indicated by the image location information contained in the document, from text character strings to be transformed that are contained in the document or the program;

an image location information generation part for generating new image location information specifying the image server as a request destination and specifying an image parameter that designates the extracted additional information;

an overwriting part for overwriting the image location information associated with the extracted additional information in the document with the new image location information generated; and an image request transmission part for transmitting image requests specified by the image parameter specified in the new image location information.

In order to achieve the above object, the program recorded on a computer-readable recording medium according to a fifth aspect of the present invention is a computer-readable recording medium on which is recorded a program executed by a computer for displaying text character strings of a document and an image acquired based on image location information contained in that document before acquiring this image, the program being specified by the document and causing the computer to function as an additional information extraction part for extracting additional information specifying characters or character strings that should be added to an image whose location is indicated by the image location information contained in the document, from text character strings to be transformed that are contained in the document or the program;

an image location information generation part for generating new image location information specifying the image server as a request destination and specifying an image parameter that designates the extracted additional information;

an overwriting part for overwriting the image location information associated with the extracted additional information in the document with the new image location information generated; and an image request transmission part for transmitting image requests specified by the image parameter specified in the new image location information.

In order to achieve the above object, the method according to a sixth aspect of the present invention is a method executed by a terminal for displaying text character strings of a document and an image acquired based on image location information contained in that document, this method including:

an additional information extraction step for extracting additional information specifying characters or character strings that should be added to an image whose location is indicated by the image location information contained in the document, from text character strings to be transformed that are contained in the document or a program specified by the document;

an image location information generation step for generating new image location information specifying the image server as a request destination and specifying an image parameter that designates the extracted additional information;

an overwriting step for overwriting the image location information associated with the extracted additional information in the document with the new image location information generated; and an image request transmission step for transmitting image requests specified by the image parameter specified in the new image location information.

In order to achieve the above object, the image server according to a seventh aspect of the present invention is an image server capable of communicating with a terminal for displaying text character strings of a document and an image acquired based on image location information contained in that document, this image server comprising:

an image request receiving part for receiving image requests transmitted from the terminal, this terminal comprising an additional information extraction part for extracting additional information specifying characters or character strings that should be added to an image whose location is indicated by the image location information contained in the document, from text character strings to be transformed that are contained in the document or a program specified by the document, an image location information generation part for generating new image location information specifying the image server as a request destination and specifying an image parameter that designates the extracted additional information, and an overwriting part for overwriting the image location information associated with the extracted additional information in the document with the new image location information generated, these image requests specified by the image parameter specified in the new image location information;

an image generation part for generating images to which are added characters or character strings specified by the additional information designated by the image parameter specified in the received image request; and an image response transmission part for transmitting the generated images as an image response to the terminal that is the transmission source of the received image request.

In order to achieve the above object, the program according to an eighth aspect of the present invention is a program executed by a computer capable of communicating with a terminal for displaying text character strings of a document and an image acquired based on image location information contained in that document, the program causing the computer to function as:

an image request receiving part for receiving image requests transmitted from the terminal, this terminal comprising an additional information extraction part for extracting additional information specifying characters or character strings that should be added to an image whose location is indicated by the image location information contained in the document, from text character strings to be transformed that are contained in the document or a program specified by the document, an image location information generation part for generating new image location information specifying the image server as a request destination and specifying an image parameter that designates the extracted additional information, and an overwriting part for overwriting the image location information associated with the extracted additional information in the document with the new image location information generated, these image requests specified by the image parameter specified in the new image location information;

an image generation part for generating images to which are added characters or character strings specified by the additional information designated by the image parameter specified in the received image request; and an image response transmission part for transmitting the generated images as an image response to the terminal that is the transmission source of the received image request.

In order to achieve the above object, the program recorded on a computer-readable recording medium according to a ninth aspect of the present invention is a computer-readable recording medium on which is recorded a program executed by a computer capable of communicating with a terminal for displaying text character strings of a document and an image acquired based on image location information contained in that document, the program causing the computer to function as:

an image request receiving part for receiving image requests transmitted from the terminal, this terminal comprising an additional information extraction part for extracting additional information specifying characters or character strings that should be added to an image whose location is indicated by the image location information contained in the document, from text character strings to be transformed that are contained in the document or a program specified by the document, an image location information generation part for generating new image location information specifying the image server as a request destination and specifying an image parameter that designates the extracted additional information, and an overwriting part for overwriting the image location information associated with the extracted additional information in the document with the new image location information generated, these image requests specified by the image parameter specified in the new image location information;

an image generation part for generating images to which are added characters or character strings specified by the additional information designated by the image parameter specified in the received image request; and an image response transmission part for transmitting the generated images as an image response to the terminal that is the transmission source of the received image request.

In order to achieve the above object, the method according to a tenth aspect of the present invention is a method executed by an image server capable of communicating with a terminal for displaying text character strings of a document and an image acquired based on image location information contained in that document, this method including:

an image request receiving step for receiving image requests transmitted from the terminal, this terminal comprising an additional information extraction part for extracting additional information specifying characters or character strings that should be added to an image whose location is indicated by the image location information contained in the document, from text character strings to be transformed that are contained in the document or a program specified by the document, an image location information generation part for generating new image location information specifying the image server as a request destination and specifying an image parameter that designates the extracted additional information, and an overwriting part for overwriting the image location information associated with the extracted additional information in the document with the new image location information generated, these image requests specified by the image parameter specified in the new image location information;

an image generation step for generating images to which are added characters or character strings specified by the additional information designated by the image parameter specified in the received image request; and an image response transmission step for transmitting the generated images as an image response to the terminal that is the transmission source of the received image request.

In order to achieve the above object, the browsing system according to an eleventh aspect of the present invention is a browsing system comprising a terminal, a document server, an image server and a transformation server, wherein:

(a) the terminal comprises:

a document location information accepting part for accepting input of first document location information;

a terminal-side document request transmission part for transmitting a first document request specifying a first parameter specified in the first document location information, to the transformation server specified as a request destination in the first document location information accepted;

a terminal-side document response receiving part for receiving, from the transformation server, a first document response in concert with the first document request;

a program executor for executing on the first document a program specified in the first document received as the first document response;

an image location information extraction part for extracting image location information contained in the first document on which the program is executed;

an image request transmission part for transmitting an image request specifying an image parameter specified in the image location information to the image server specified as a request destination in the extracted image location information;

an image response receiving part for receiving an image response in concert with the image request, from the image server; and a document display for displaying text character strings of the first document on which the program is executed, and images received as the image response;

(b) the transformation server comprises:

a transformation server-side document request receiving part for receiving the first document request;

a document location information extraction part for extracting second document location information designated by the first parameter specified in the first document request that was received;

a transformation server-side document request transmission part for transmitting a second document request specifying the second parameter specified in the second document location information, to the document server specified as a request destination in the extracted second document location information;

a transformation server-side document response receiving part for receiving, from the document server, a second document response in concert with the second document request;

a transformation part for implementing a prescribed transformation process on text character strings contained in a second document received as the second document response, and through this transforming the second document into the first document; and a transformation server-side document response transmission part for transmitting the first document after transformation by the transformation process as the first document response to the terminal that is the transmission source of the received first document request;

wherein the prescribed transformation process maintains a program specified by the second document;

(c) the document server comprises:

a document server-side document request receiving part for receiving the second document request; and a document server-side document response transmission part for transmitting the second document designated by the second parameter specified in the received second document request as the second document response to the transformation server that is the transmission source of the received second document request;

(d) the image server comprises:

an image request receiving part for receiving the image request;

an image generation part for generating an image to which are added characters or character strings specified by the additional information specified by the image parameter specified in the received image request; and an image response transmission part for transmitting the generated image as an image response to the terminal that is the transmission source of the received image request;

wherein the document location information accepting part of the terminal accepts the first document location information specifying the first parameter designating "the second document location information specifying the second parameter designating the required second document, with the document server as the request destination", with the transformation server as the request destination; and the program specified in the second document received as the second document response transmitted from the document server causes the program executor of the terminal to function as (1) an additional information extraction part for extracting additional information specifying the characters or character strings that should be added to the image whose location is expressed by the image location information contained in that document, from the document that is the execution target of the program containing the first document and the second document or text character strings that are the target of transformation contained in the program specified by that document;

(2) an image location information generation part for generating new image location information specifying an image parameter designating extracted additional information, with the image server specified as the request destination; and (3) an overwriting part for overwriting image location information corresponding to the extracted additional information with the generated new image location information, in the document that is the execution target of the program.

With the present invention, an image is output, added to which is additional information (characters or character strings) extracted from a text character string that is a transformation target. That is to say, when a document is not transformed, an image is output to which are added untransformed characters or character strings extracted from the untransformed original text character string, and when a document is transformed, an image is output to which are added transformed characters or character strings extracted from a post-transformation text character string. Accordingly, with the present invention the defect of characters or character strings contained in an image not being transformed when a transformation such as translation is undertaken is eliminated.

BRIEF DESCRIPTION OF DRAWINGS

FIG. 1 is a system configuration diagram showing one configuration example of a browsing system according to a preferred embodiment of the present invention;

FIG. 4A is a flowchart showing one example of a post-transformation document display process executed by the terminal;

FIG. 4B is a flowchart showing one example of a transformation process executed by a transformation server;

FIG. 4C is a flowchart showing one example of a document transmission process executed by a document server;

FIG. 4D is a flowchart showing one example of an image transmission process executed by an image server;

FIG. 6A is a drawing showing one example of document information of the pre-transformation document;

FIG. 6B is a drawing showing one example of document information of the post-transformation document;

FIG. 7 is a flowchart showing one example of an image location information change process executed by the terminal;

FIG. 8A is a flowchart showing one example of a pre-transformation document display process executed by the terminal;

FIG. 8C is a flowchart showing another example of an image transmission process executed by the image server.

MODE FOR CARRYING OUT THE INVENTION

Figure 2A:
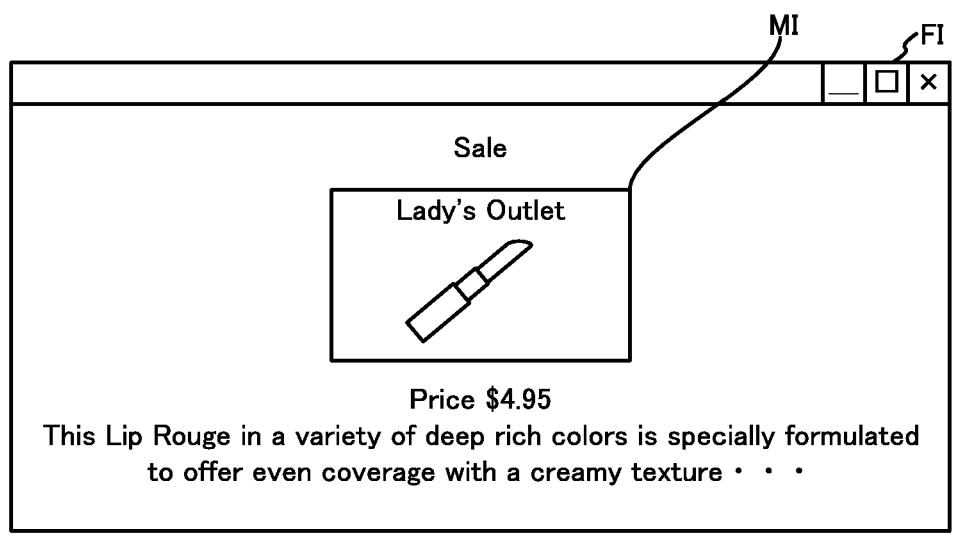
FIG. 2A is a drawing showing one example of a pre-transformation document.

Below, the preferred embodiment of the present invention is described with reference to the attached drawings.

A browsing system 1 according to the present invention is composed of a computer communication network 10 (hereafter called simply a communication network), a terminal 100, an image server 200, a document server 300 and a transformation server 400, as shown in FIG. 1.

The communication network 10 is composed, for example, of the Internet. The communication network 10 may also be a LAN (Local Area Network) or a public circuit network.

Before describing the terminal 100, the image server 200, the document server 300 and the transformation server 400 will be described.

The image server 200 stores multiple image IDs identifying images and image information represent those images, associating such with each other.

The document server 300 stores document information represents a document describing images stored on the image sever 200 and text explaining those images, and document path information expressing relative paths of that document information, associating such with each other. This document information includes information expressing text and image location information expressing the location of the images.

In this preferred embodiment, it is explained that the text expressed by text information stored by the document server 300 is Web pages written in HTML (HyperText Markup Language). However, this is intended to be illustrative and not limiting, for it would be fine for the document to be expressed in another markup language such as XML (eXtensible Markup Language), for example.

The transformation server 400 transforms documents (hereafter referred to as pre-transformation documents) by executing a prescribed transformation process on the text character strings of documents expressed by input document information, and outputs document information expressing the transformed document (hereafter referred to as post-transformation documents).

In this preferred embodiment, the prescribed transformation process executed by the transformation server is explained as a translation process, but this is intended to be illustrative and not limiting, for it would be fine for this to be a process that encrypts unencrypted documents, for example, or to be a process that deciphers encrypted documents.

The terminal 100 is described as comprising a personal computer, but it would be fine for this to comprise a PDA (Personal Digital Assistant) or a cell phone.

As shown in FIG. 2A, document location information expressing the location of the pre-transformation document which contains text character strings and an image MI to which characters or character strings are added (in other words expressed) is input into the terminal. In addition, a language specified by the user (hereafter referred to a "specified language") and translation commands commanding translation of a document at a location expressed by the input document location information into the specified language are input into the terminal 100.

Figure 2B:
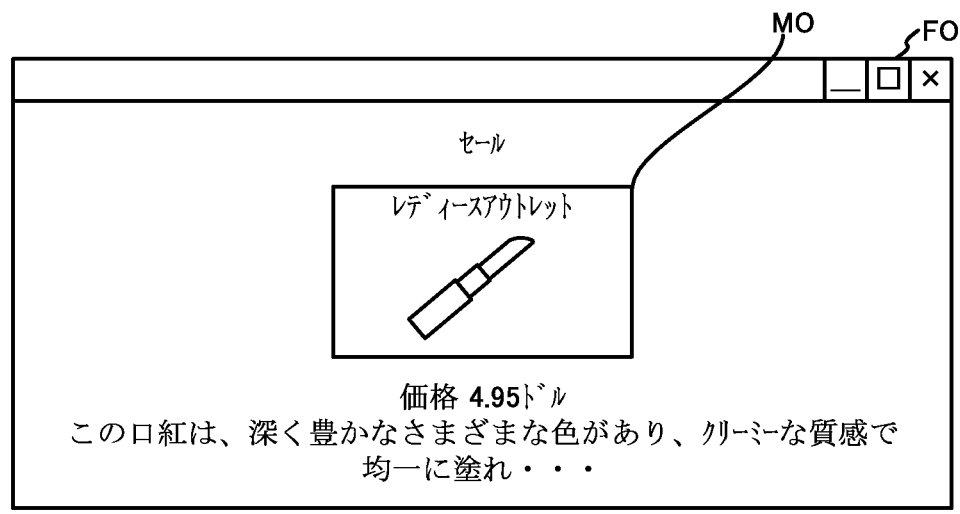
FIG. 2B is a drawing showing one example of a post-transformation document.

Next, the terminal 100 displays a post-translation document such as that shown in FIG. 2B which contains a text string that is the text string translated into the specified language, and an image MO expressing text or a text string that is the text or text string translated into the specified language.

In this preferred embodiment, the explanation assumes the language of the pre-transformation document (hereafter referred to as the pre-transformation language) is English and the specified language is Japanese, but this is intended to be illustrative and not limiting.

As shown in FIG. 3A, the terminal 100 comprises a CPU (Central Processing Unit) 100a, a ROM (Read Only Memory) 100b, a RAM (Random Access Memory) 100c, a hard disk 100d, a media controller 100e, a LAN (Local Area Network) card 100f, a video card 100g, an LCD (Liquid Crystal Display) 100h, a keyboard 100i, a speaker 100j and a touch pad 100k.

The CPU 100a accomplishes complete control of the terminal 100 by executing software processes in accordance with programs stored on the ROM 100b or the hard disk 100d. The RAM 100c temporarily stores data that is to be processed during execution of a program by the CPU 100a.

The hard disk 100d stores tables preserving various kinds of data. The terminal 100 may also be provided with flash memory in place of the hard disk 100d.

The media controller 100e reads various types of data and programs from recording media including flash memory, CD (Compact Disc), DVD (Digital Versatile Disc), or Blu-ray Disc (registered trademark).

The LAN card 100f sends and receives data among the image server 200, the document server 300 and the transformation server 400, connected via the communication network 10.

The keyboard 100i and the touchpad 100k input signals or information in accordance with operation by the user. The terminal 100 may be provided with a touch panel in place of the touchpad 100k.

The video card 100g draws (that is to say, renders) images based on digital signals output from the CPU 100a, and also outputs image signals indicating the drawn image.

The LCD 100h displays images in accordance with image signals output from the video card 100g. The terminal 100 may be provided with a PDP (Plasma Display Panel) or an EL (Electroluminescence) display in place of the LCD 100h.

The speaker 100j outputs audio based on signals output from the CPU 100a.

The configurations of the image server 200, the document server 300 and the transformation server 400 are the same as the configuration of the terminal 100, so explanation of such is omitted.

Figure 5A:
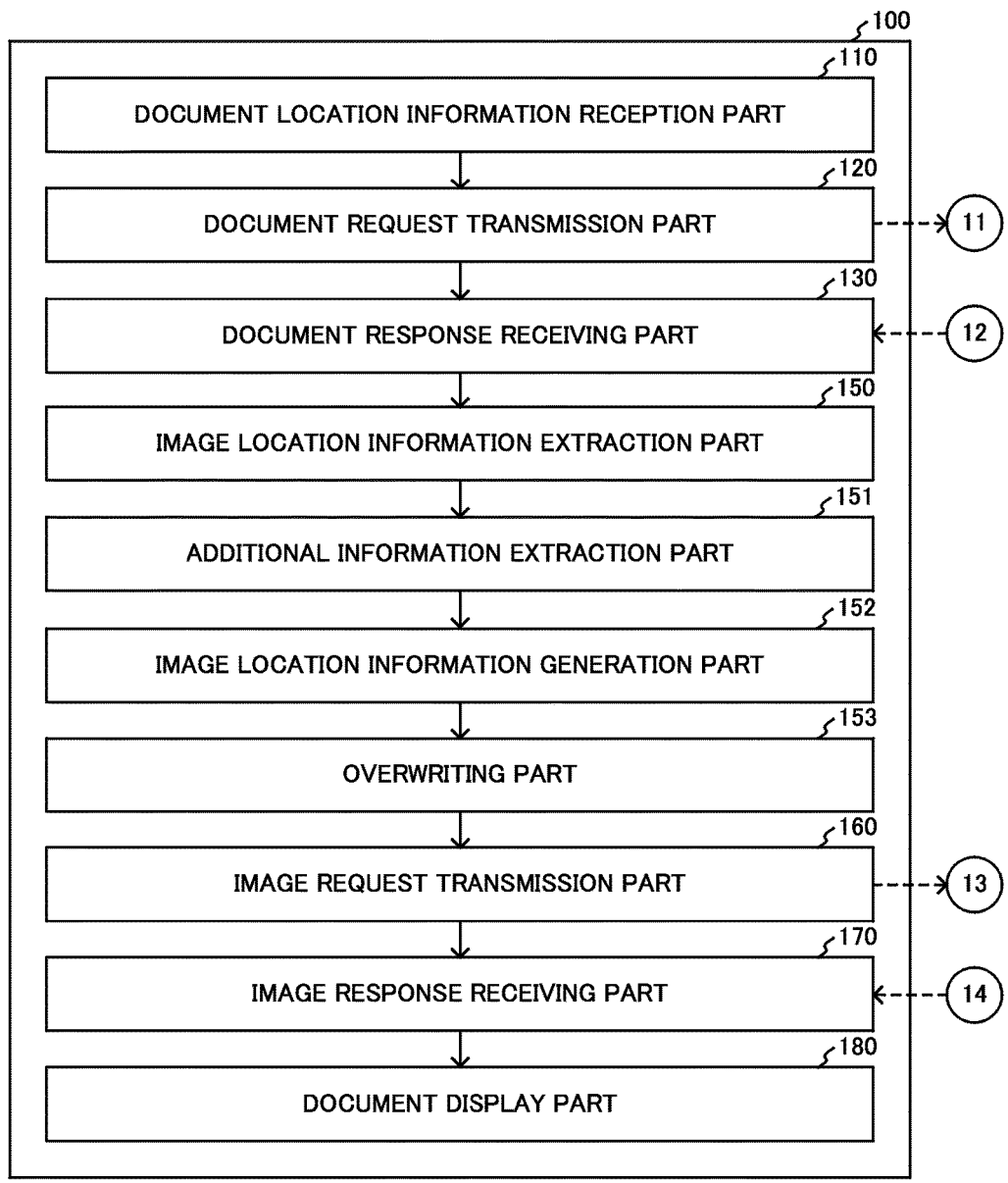
FIG. 5A is a function block diagram showing one example of functions exhibited by the terminal.

The CPU 100a of the terminal 100 executes a script process specified by the below-described post-transformation document based on the post-transformation document display process of FIG. 4A. Through this, the CPU 100a functions as an image location information extraction part 150, an additional information extraction part 151, an image location information generation part 152 and a overwriting part 153, as shown in FIG. 5A.

Figure 3:
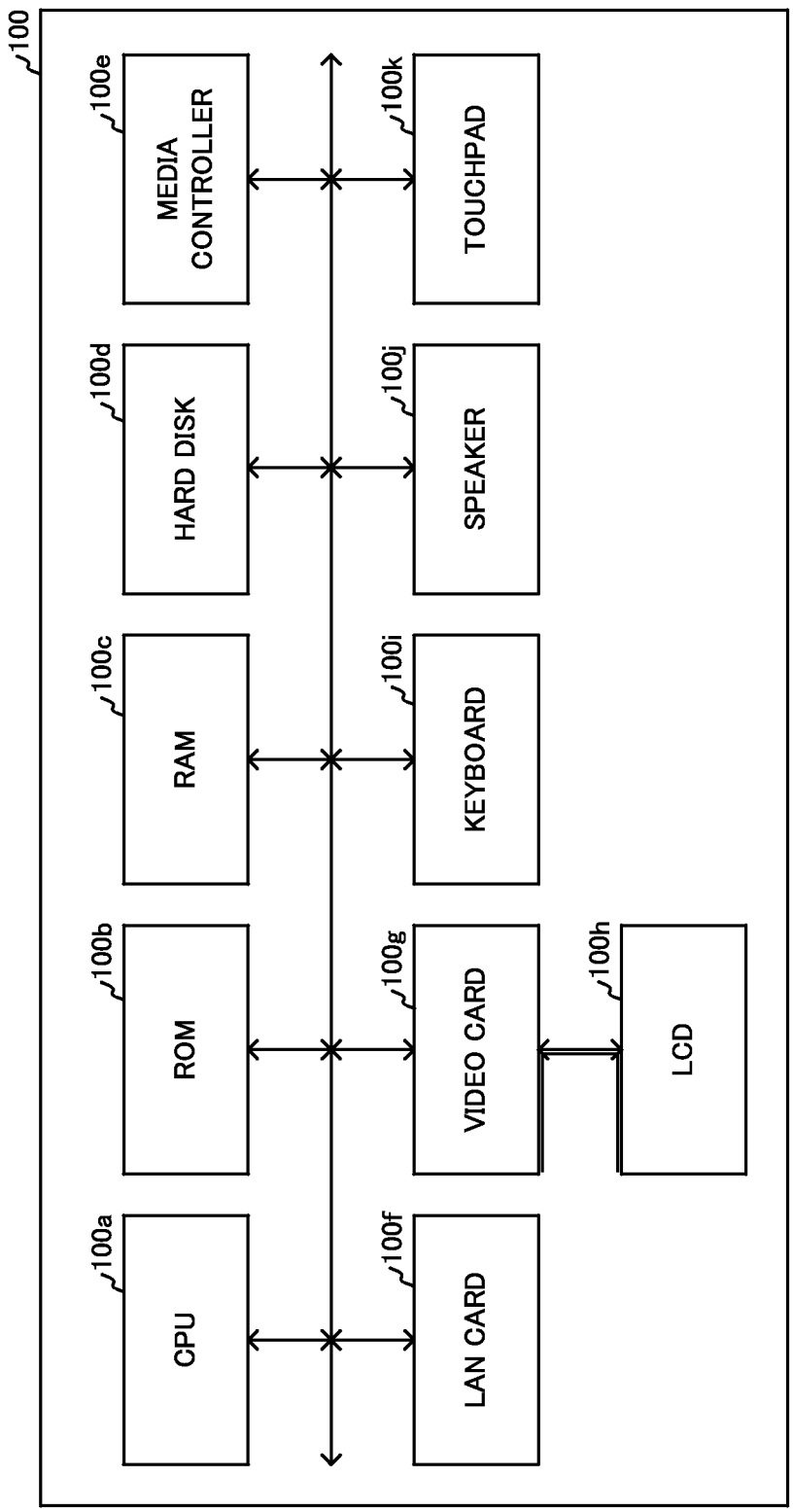
FIG. 3 is a hardware configuration diagram showing one example of the configuration of a terminal.

In addition, the CPU 100a works together with the LAN card 100f of FIG. 3 to function as a document request transmission part 120, a document response receiving part 130, an image request transmission part 160 and an image response receiving part 170. Furthermore, the CPU 100a works together with the keyboard 100i and the touchpad 100k to function as a document location information accepting part 110, and works together with the LCD 100h to function as a document display part 180.

Figure 5B:
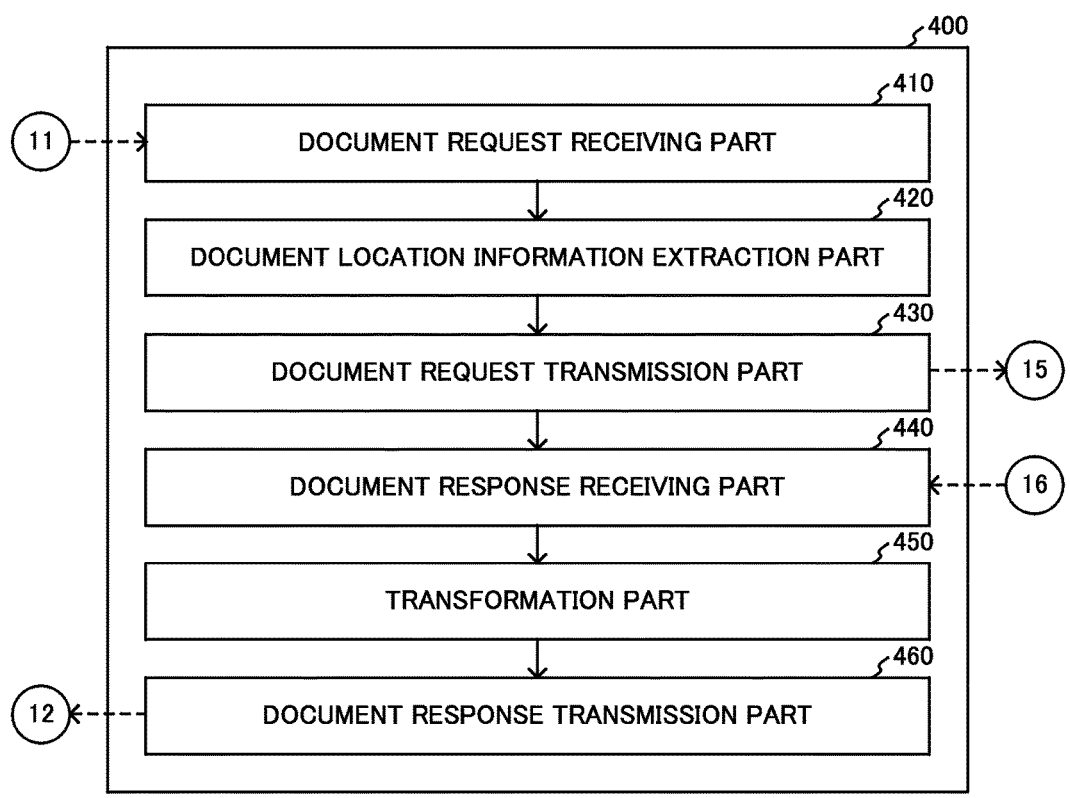
FIG. 5B is a function block diagram showing one example of functions exhibited by the transformation server.

An unrepresented CPU of the transformation server 400 functions as a document location information extraction part 420 and a transformation part 450 such as that shown in FIG. 5B by executing the transformation process shown in FIG. 4B. In addition, the CPU of the transformation server 400 works together with a unrepresented LAN card to function as a document request receiving part 410, a document request transmission part 430, a document response receiving part 440 and a document response transmission part 460.

Figure 5C:
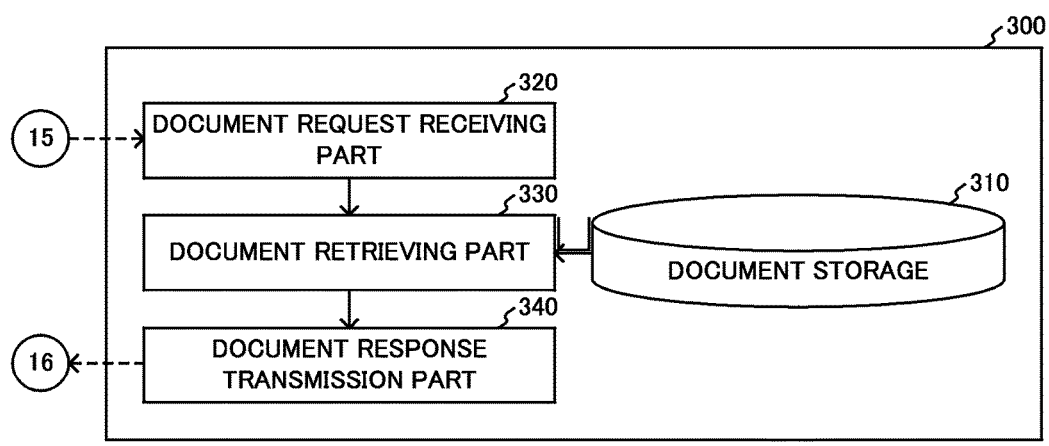
FIG. 5C is a function block diagram showing one example of functions exhibited by the document server.

An unrepresented CPU of the document server 300 functions as a document retrieving part 330 such as is shown in FIG. 5C by executing the document transmission process of FIG. 4C. In addition, the CPU of the document server 300 work together with an unrepresented hard disk to function as a document storage 310, and works together with an unrepresented LAN card to function as a document request receiving part 320 and a document response transmission part 240. The document storage 310 stores multiple items of the above-described document path information and document information associated with each other.

Figure 5D:
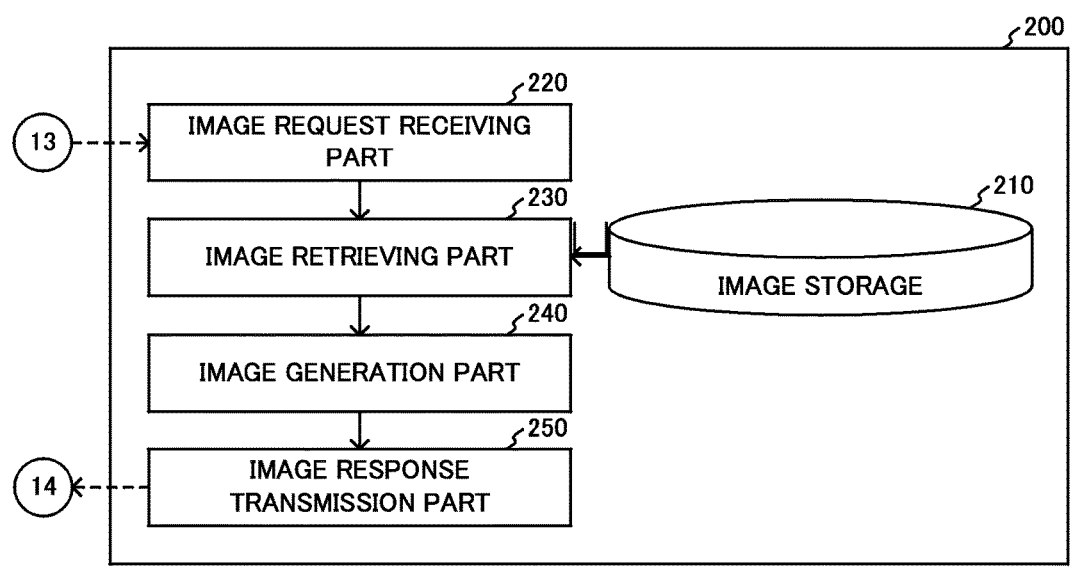
FIG. 5D is a function block diagram showing one example of functions exhibited by the image server.

An unrepresented CPU of the image server 200 functions as an image retrieving part 230 and an image generation part 240 such as those shown in FIG. 5D by executing the image transmission process of FIG. 4D. In addition, the CPU of the image server 200 works together with an unrepresented LAN card to function as an image request receiving part 220 and an image response transmission part 250, and works together with an unrepresented hard disk to function as an image storage 210. The image storage 210 stores multiple of the above-described images ID and image information associated with each other.

Below, the post-transformation document display process for displaying a post-transformation document shown in FIG. 2B is described with reference to FIG. 4A.

The CPU 100a of the terminal 100 starts the post-transformation document display process of FIG. 4A when a signal is input from the keyboard 100i or the touchpad 100k or FIG. 3.

When the post-transformation document display process is started, the URL of the transformation sever 400 input by the user and a URL indicating the location of the document to be transformed by the transformation server are input into the document location information accepting part 100 of FIG. 5A.

Here, an explanation will be given assuming that "http://www.transformserver.co.jp" is input as the URL of the transformation server 400. In addition, the explanation will be given assuming that "http://www.documentserver.co.jp/dir/page.html" is input as the URL indicating the location of the document to be transformed by the transformation server 400.

Next, the document location information accepting part 110 accepts the first document location information "http://www.transformserver.co.jp?first_parameter" based on the input URL. Here, the first document location information is information specifying a first parameter designating the below-described second document location information with the transformation server 400 as the destination of the request. That is to say, within the first document location information, the part "transformserver.co.jp" indicating the domain name (it would be fine of this were the IP address) of the server contained in the URL of the transformation server 400 is the part that makes that server the transmission destination (that is to say, the request destination) of the request. In addition, to designate the first parameter through the first document location information, the method of adding that first parameter after adding the character "?" to the end of that part is used.

In addition, the second document location information is information specifying a second parameter designating a pre-transformation document, with the document server 300 as the request destination. This second document location information is the above-described URL accepted, namely "http://www.documentserver.co.jp/dir/page.html". In other words, "documentserver.co.jp" in the URL is the part identifying the document server 300 as the transmission destination, and the part "dir/page.html" indicating the relative path of the pre-transformation document on the document server 300 is the second parameter designating this pre-transformation document.

In addition, the document location information accepting part 100 accepts, besides the first document location information, information indicating the pre-transformation language, information indicating the specified language specified by the user and a translation command commanding the document in the pre-transformation language to be translated into the specified language (step S11).

Following this, the document location information accepting part 110 generates a parameter "sl=en&tl=ja" indicating that the pre-transformation language is English and the specified language is Japanese. Following this, the document location information accepting part 110 further adds the parameter "sl=en&tl=ja" to the first parameter "u=http://www.documentserver.co.jp/dir/page.html" designating the second document location information. Through this, the document location information accepting part 110 sets "http://www.transformserver.co.jp?sl=en&tl=ja&u=http://www.documentserver.co.jp/dir/page.html" as the first document location information.

Next, the document request transmission part 120 of FIG. 5A generates a first document request (hereafter called the "first request") based on the first document location information, and transmits the generated first document request to the transformation server 400 (step S12). The first request is a request seeking for the first request transmission part 120 to transmit document information indicating the post-transformation document as a first document response (hereafter called the "first response"), and is a request specified by the above-described first parameter. Here, the explanation of the post-transformation document display process executed by the terminal 100 will be temporarily interrupted.

An unrepresented CPU of the transformation server 400 starts the transformation process shown in FIG. 4B when an unrepresented LAN card receives data.

When the transformation process starts, the document request receiving part 410 of FIG. 5B receives the first document request (in other words, the first request) from the terminal 100 (step S21).

Next, the document location information extraction part 420 extracts the first parameter "sl=en&tl=ja&u=http://www.documentserver.co.jp/dir/page.html" froml the first document request. Furthermore, the document location information extraction part 420 extracts the second document location information "http://www.documentserver.co.jp/dir/page.html" from the extracted first parameter, and extracts the information "sl=en" indicating the pre-transformation language and the information "tl=ja" as the specified language (step S22).

Following this, the document request transmission part 430 transmits a second document request (hereafter also called the "second request") specifying the second parameter "dir/page.html" to the document server 300 specified as the request destination in the extracted second document location information (step S23). Here, the explanation of the transformation process executed by the transformation server 400 will be temporarily interrupted.

An unrepresented CPU of the document server 300 starts the document transmission process shown in FIG. 4C when an unrepresented LAN card receives data.

When the document transmission process is started, the document request receiving part 320 of FIG. 5C receives the second document request (in other words, the second request) from the transformation server 400 (step S31).

Next, the document retrieving part 330 generates document path information for the document whose transmission is requested, from the second parameter "dir/page.html" specified in the received second document request, and retrieves document information stored in the document storage 310 corresponding to the generated document path information (step S32).

Next, the document response transmission part 340 replies to the transformation server 400 with the retrieved document as the second response (in other words, the document response) (step S33), and then execution of the document transmission process concludes.

Next, the explanation of the transformation process executed by the transformation server 400 is restarted.

Following step S23 in FIG. 4B, the document response receiving part 440 of FIG. 5B receives document information as the second document response (that is to say, the second response) from the document server 300 (step S24).

Next, the transformation part 450 accomplishes a text transformation process that translates the text character strings of the transform document indicated by the received document information from the pre-transformation language of English indicated by the information "sl=en" extracted in step S22 into the specified language of Japanese indicated by the information "tl=ja" (step S25).

Following this, the document response transmission part 460 of FIG. 5B transmits document information indicating the post-transformation document as the first document response (that is to say, as the first response) to the terminal 100 (step S26), and following this, execution of the transformation process concludes.

In this preferred embodiment, the pre-transformation document is a document written in HTML, such as that shown in FIG. 6A. This document contains English character strings such as "Sale" and "Price $4.95" in the area surrounded by the "body" tag BDI. In addition, when this document can carry an image at a location indicated by the image location information "./img.gif" contained in the "src" attribute of the "img" tag IMI, that image is carried between the above-described character strings "Sale" and "Price $4.95". In contrast, when this document cannot carry that image, the character string "Lady's Outlet" described at the "alt" attribute is carried.

In addition, in this preferred embodiment, the character string "Lady's Outlet" described in the "alt" attribute is used as a character string added to that image (that is to say, is indicated as an image in that image), so the information indicating the character string described in the "alt" attribute is labeled as additional information.

The transformation server 400 translates the document information of FIG. 6A into the document information of FIG. 6B in step S25 of the above-described FIG. 4B. At this time, the transformation server 400 translates the English character strings "Sale" and "Price $4.95" and/or the like into the Japanese " セール " and " 価格 4．9 5 ドル " and/or the like. In addition, the transformation server 400 translates the character string "Lady's Outlet" described in the "alt" attribute of the "img" tag IMI shown in FIG. 6A into the Japanese " レディースアウトレット ", and through this transforms the "img" tag IMI into "img" tag IMO.

However, the transformation server 400 does not translate the control code used in executing the program, such as the image location information "./img.gif" described in the "src" attribute of the "img" tag IMI or other tags. This is so that the program's execution process is possible and execution of the control content executed does not change even if messages or sentences input and output before and after translation change.

In addition, in the pre-transformation document, the function name "transText( )" is described in the "onload" attribute of the "body" tag BDI, as shown in FIG. 6A. A function FCI of this function name accomplishes an image location information change process changing the image location information carried in the "img" tag indicated by the document information of the process target, with the document information of that function's call as the process target. Details of the image location information change process are described below.

This image location information change process is determined by a character string described in a computer language such as JavaScript (registered trademark). The transformation server 400 for example excludes character strings contained in comments and quotation marks, and does not accomplish a transform of character strings indicating this image location information change process. That is because processes executed before and after translation are not changed (in other words, programs are maintained).

The image location information change process executed by the function FCI may be described in the HTML file that is the function FCI's call, or may be described in a file differing from the HTML file, such as a js file.

Next, the explanation of the post-transformation document display process executed by the terminal 100 will be restarted.

Following step S12 in FIG. 4A, the document response receiving part 130 of FIG. 5A receives the first response from the transformation server 400 (step S13).

Next, when browsing of the document information of the post-transformation document received as the first response concludes, a load process is executed that starts execution of the function FCI described in the "onload" attribute of the "body" tag BDI (step S14)

When execution of the above-described function FCI begins, the image location information change process shown in FIG. 7 is executed with the document information of the post-transformation document as the process target (step S15).

When the image location information change process of FIG. 7 is started, the image location information extraction part 150 of FIG. 5A acquires the return value obtained by giving the character string "testImg" as an argument to a method known as "getElementById( )". Through this, the image location information extraction part 150 extracts the "img" tag (hereafter called the target img tag) IMO having the "id" attribute of "testImg" from the document information that was the process target, such as is shown in FIG. 6B (step S51).

Next, the image location information extraction part 150 references the "src" property of the instance of the target img tag IMO acquired as a return value. Through this, the image location information extraction part 150 extracts the image location information "limg.gif? described in the "src" attribute of the target img tag IMO from that tag IMO (step S52).

Following this, the additional information extraction part 151 similarly extracts additional information specifying the character string "レディースアウトレット" described in the "alt" attribute from the extracted target img tag IMO, and accomplishes an additional information extraction process stored in the variable "text" (step S53).

Following this, the image location information generation part 152 executes an image location information generation process that generates new image location information (also called image obtaining information) based on the image location information extracted by the additional information extraction part 151 and the additional information stored in the variable "text" (step S54).

With this preferred embodiment, the explanation assumes that the new image location information of 'http://www.imageserver/imgtest.php?bkimg=bk1.jpg&setstring=レディースアウトレット" is generated. This new image location information contains the part "http://www.imageserver" specifying the image server 200 as the request destination. In addition, this new image location information contains the part "imgtest.php?bkimg=bk1.jpg&setstring=" specifying the image parameter designating additional information specifying the character string "レディースアウトレット" or the characters added to the background information and background image identifying the background image. Furthermore, this new image location information contains additional information specifying "レディースアウトレット" stored in the variable "text".

Next, the overwriting part 153 overwrites the "src" property of the instance of the target img tag IMO to the generated new image location information. Through this, the transformer sets this new image location information to the "src" attribute of the "img" tag IMO (step S55) and then execution of the image location information change process concludes.

Following step S15 in FIG. 4A, the image request transmission part 160 of FIG. 5A generates an image request (hereafter also called an image transmission request) specifying the above-described image parameter 'http://www.imageserver/imgtest.php?bkimg=bk1.jpg&setstring=

"レディースアウトレット"" based on the overwritten new image location information. Next, the image request transmission part 160 transmits the generated image transmission request to the image server 200 (step S16). Here, explanation of the post-transformation document display process executed by the terminal 100 will again be interrupted.

An unrepresented CPU of the image server 200 starts an image transmission process like that shown in FIG. 4D when data is received by an unrepresented LAN card.

When the image transmission process is started, the image request receiving part 220 of FIG. 5D receives the image request (that is to say, the image transmission request) from the terminal 100 (step S41).

Next, the image retrieving part 230 extracts the image parameter "imgtest.php?bkimg=bk1.jpg&setstring=レディースアウトレット" from the image request. Next, the image retrieving part 230 retrieves image information of the background image attached corresponding to the same image ID as the background information "bk1.jpg" designated by the extracted image parameter, from the image storage 210 (step S42).

Next, the image generation part 240 reads the retrieved image information from the image storage 210 (step S43).

Following this, the image generation part 240 designates the additional information based on the extracted image parameter "imgtest.php?bkimg=bk1.jpg&setstring=レディースアウトレット". Next, the image generation part 240 generates character images indicating the post-translation character string "レディースアウトレット" specified by the additional information. Following this, an image MO to which the generated character image is added (in other words, overlaid) is generated for the background image indicated by the read image information (step S44).

Following this, the image response transmission part 250 of FIG. 5D transmits image information indicating the generated image MO to the terminal 100 as the image response (hereafter also called image response) (step S45), and following this execution of the image transmission process concludes.

Next, explanation of the post-transformation document display process executed by the terminal 100 will be restarted.

Following step S16 in FIG. 4A, the image response receiving part 170 of FIG. 5A receives the image response (that is to say, the image response) from the image server 200 (step S17).

Next, the document display part 180 displays the image MO indicated by the image information received as an image response and a text character string indicated by the document information of the post-transformation document on the screen FO, as shown in FIG. 2B (step S18), and following this execution of the post-transformation document display process concludes.

Next, a pre-transformation document display process for displaying the pre-transformation document shown in FIG. 2A is explained with reference to FIG. 8A in order to compare to the post-transformation document display process explained with reference to FIG. 4A.

When the pre-transformation document display process is started in the terminal 100, the document location information accepting part 110 of FIG. 5A accepts as second document location information the URL "http://www.documentserver.co.jp/dir/page.html" indicating the location of a pre-transformation document input by the user (step S61).

Next, the document request transmission part 120 of FIG. 5A transmits the second document request (that is to say, the second request) specifying the second parameter "dir/page.html" of the second document location information to the document server 300 (step S62).

Figure 8B:
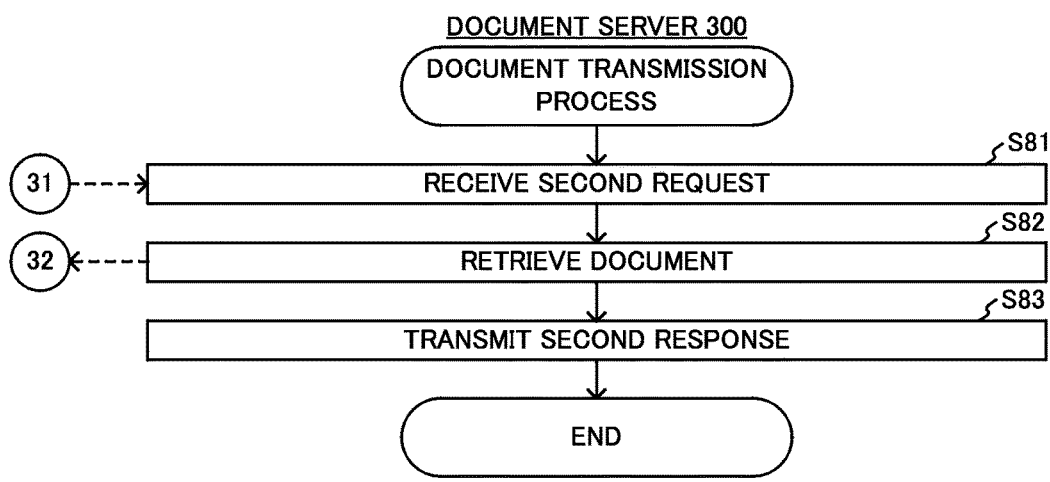
FIG. 8B is a flowchart showing another example of a document transmission process executed by the document server.

When an unrepresented LAN card receives the data, the document server 300 starts a document transmission process like that shown in FIG. 8B, similar to above. When the document transmission process is started, the document server 300 executes the same process as in steps S31 to S33 of FIG. 4C and then execution of the document transmission process concludes.

In other words, the document server 300 receives the second document request (that is to say, the second request) from the terminal 100 (step S81) and retrieves document information such as that shown in FIG. 6A based on the second document request received (step S82). Following this, the document server 300 replies with the retrieved document information to the terminal 100 as the second response (that is to say, the second document response) (step S83).

Following step S62 in FIG. 8A, the document response receiving part 130 of the terminal 100 shown in FIG. 5A receives the second response from the document server 300 (step S63). Following this, when browsing of the document information of the pre-transformation document received as the second response is concluded, a load process is executed that starts execution of the function FCI described in the "onload" attribute possessed by the "body" tag DBI of FIG. 6A (step S64).

When execution of the above-described function FCI is started, the image location information change process of FIG. 7 is executed with the document information of the untransformed document as the process target (step S65). Through executing this process, the "img" tag IMI is extracted from the document information of the pre-transformation document shown in FIG. 6A, and the additional information specifying the untransformed character string "Lady's Outlet" described in the "alt" attribute possessed by the "img" tag IMI is extracted. Following this, new image location information (that is to say, image import information) composed of image parameters designating that additional information, "http://www.imageserver/imgtest.php?bkimg=bk1.jpg&setstring=Lady's Outlet", is generated. Following this, the new image location information is set to the "src" attribute possessed by the "img" tag IMI of FIG. 6A.

Following step S65 in FIG. 8A, a process similar to step S16 through step S18 of FIG. 4A is executed (steps S66 through S68), and then execution of the pre-transformation document display process concludes. Through this, the text character strings "Sale" and "$4.95" that are not transformed as shown in FIG. 2B, and the image to which the untransformed character string "Lady's Outlet" was added, are displayed on a screen FI of FIG. 2A.

According to these configurations, the terminal 100 extracts additional information from the post-transformation document (hereafter called the first document) whose test character strings were transformed, and displays the image to which the characters or character strings specified by the extracted additional information was added, and the transformed text character string of that post-transformation document (that is to say, the first document). Consequently, the terminal 100 can display a post-transformation document containing an image indicating the transformed characters or character strings and the transformed text. In other words, the user can peruse the post-transformation document (first document) containing an image indicating the transformed characters or character strings and not just the transformed text.

In addition, according to these configurations, the terminal 100 accepts second document location information specifying a second parameter designating the pre-transformation document (hereafter called the second document) on which the transformation process has not been conducted. Upon accepting the second document location information, the terminal 100 extracts the additional information from the pre-transformation document, and displays the image to which the characters or character strings specified by the extracted additional information are added, and the text character string of the pre-transformation document. Consequently, the terminal 100 can display the pre-transformation document containing the image indicating the untransformed characters or character strings, and untransformed text. In other words, the user can peruse the pre-transformation document (that is to say the second document) containing not just the untransformed text but also an image indicating the untransformed characters or character strings.

Thus, as has already been explained, because the characters and character strings described in the "src" attribute of the "img" tag written in HTML indicate the location of the image displayed, normally such is excluded from being an object of the transformation process. In contrast, the characters and character strings described in the "alt" attribute of the "img" tag are displayed in place of that image when an image has not been acquired or cannot be acquired from the location described in the "src" attribute, and thus normally becomes a target of the transformation process. In addition, the terminal 100 executes the program in which the "onload" attribute of the "body" tag is described before acquiring an image from the location described in the "src" attribute of the "img" tag. Hence, according to these configurations, the terminal 100 executes the program in which the "onload" attribute is described before acquiring the image at the location described in the "src" attribute of the "img" tag. Consequently, if the terminal 100 receives the post-change document (the first document) that is a transformation of the pre-transformation document (second document) expressed in HTML, the terminal can receive the image that is at the location described in the "src" attribute of the "img" tag that did not become the target of transformation and to which are added characters or character strings indicating the "alt" attribute of the "img" tag that was a target of transformation.

In addition, according to these configurations, after extracting the additional information from the translated text character strings of the pre-transformation document (second document), the terminal 100 displays the image to which the characters or character strings specified by the extracted additional information are added, and the translated text character strings of the pre-transformation document (second document). Consequently, the terminal 100 can display the document containing the image indicating the translated characters or character strings and the translated text, even without storing in advance images to which characters or character strings translated into each translation language have been added. In addition, when the image contained in the pre-transformation document is an advertising image and the characters or character strings added to that image express advertising content, the characters or character strings expressed in the image are also displayed translated and not just the text character strings carried in the document so it is possible to advertise to users with a stronger appeal than in the past.

(First Variation)

With this preferred embodiment, the browsing system 1 was explained as comprising the separate devices of a terminal 100, an image server 200, a document server 300 and a transformation server 400. However, this is intended to be illustrative and not limiting, for two or more out of the terminal 100, the image server 200, the document server 300 and the transformation server 400 may be integrally composed. For example, the image server 200 and the document server 300 may be integrally composed, or the terminal 100, the image server 200, the document server 300 and the transformation server 400 may all be integrally composed.

(Second Variation)

Furthermore, the terminal 100, the image server 200, the document server 300 and the transformation server 400 may each be realized with multiple devices. In other words, the functions the terminal possesses may be realized with multiple devices. Similarly, the functions the image server 200, the document server 300 and the transformation server 400 respectively possess may be respectively realized with multiple devices.

(Third Variation)

In addition, in this preferred embodiment the additional information was explained as specifying the characters or character strings described in the "src" attribute of the "img" tag. In addition, the additional information extraction part 151 of FIG. 5A was explained in step S53 of FIG. 7 as extracting the characters or character strings described in the "alt" attribute of the "img" tag extracted from the document using the method of "getElementById( )". However, this is intended to be illustrative and not limiting, for it would be fine for example for the additional information to be characters or character strings enclosed by a different type of tag having the "class" attribute or the "id" attribute in which character strings (for example, the same character strings or partially the same character strings) corresponding to the character string "testImg" described in the "id" attribute of the "img" tag. In particular, the characters or character strings enclosed by those other types of tags may be set so as to not be visible. The characters or character strings enclosed by that kind of different type of tag or that tag can be extracted from the document using the method of "getElementsByClassName( )" that returns elements of tags having the "class" attribute of a prescribed name.

According to these configurations, if this is a tag possessing the "id" attribute or the "class" attribute, the tag is used as a tag enclosing the characters or character strings added to the image, so it is possible to note more freely than in the past the characters or character strings added to the image for the document.

(Fourth Variation)

Furthermore, the additional information may be characters or character strings enclosed by """" (parentheses) in JavaScript (registered trademark). According to this configuration, the characters or character strings added to the image can be described more freely than in the past.

(Fifth Variation)

In addition, in this preferred embodiment the image location information extraction part 150 was explained as extracting the elements of the "img" tag possessing the "id" attribute described be a prescribed character string "testImg" for example using the method "getElementsById( )". Furthermore, the image location information extraction part 150 was explained as being able to extract the elements of the tag possessing the "class" attribute described by the prescribed character string "testImg" for example using the method "getElementsByClassName( )". However, this is intended to be illustrative and not limiting, for the image location information extraction part 150 can acquire elements of the tags even for "img" tags not possessing the "id" attribute or the "class" attribute or in which the "id" attribute or the "class" attribute are not described, using "getElementsByTagName( )". The tag for which the elements are acquired is not limited to the "img" tag and may be a different type of tag. According to this configuration, when elements of the "img" tag contained in an HTML document are successively extracted and the image location information change process of FIG. 7 is applied to each of these it is not necessary to specify in advance the "id" attribute or the "class" attribute in the "img" tag.

(Sixth Variation)

The background information may be information identifying the image at a location expressed by the image location information "./img.gif" extracted from the post-transformation document or the pre-transformation document by the additional information extraction part 151. In addition, the background information may be described in advance in a program such as JavaScript (registered trademark) specified by the pre-transformation document (that is to say, a program also specified by the post-transformation document).

According to these configurations, the terminal 100 displays an image to which transformed characters or character strings are added to the background image identified by background information described in the program specified by the pre-transformation document or the pre-transformation document (second document). Consequently, if the background information described in the program specified by the pre-transformation document or the pre-transformation document (second document) is caused to vary, the terminal 100 can display the post-transformation document (first document) containing an image to which the post-transformation characters or character strings are added to a different background.

(Seventh Variation)

Furthermore, in this preferred embodiment, the terminal 100 was explained as extracting elements of one "img" tag in which the character string of "testImg" is described, from document information indicating the document. In addition, the terminal 100 was explained as displaying a document containing an image in which a character string described in the "alt" attribute possessed by the "img" tag whose elements were extracted is added a background image at a location indicated by image location information described in the "src" attribute possessed by the "img" tag. However, this is intended to be illustrative and not limiting, for the terminal 100 can extract elements of the "img" tag (hereafter called the first "img" tag) described in the "id" attribute by the character string "testImg1", elements of the "img" tag (hereafter called the second "img" tag) described in the "id" attribute by the character string "testImg2", and elements of the "img" tag (hereafter called the third "img" tag) described in the "id" attribute by the character string "testImg3", from document information indicating the document. With this configuration, the terminal 100 can display a document containing an image in which the character string of the "alt" attribute of the first "img" tag is added to the background image designated by the "src" attribute of the first "img" tag, an image in which the character string of the "alt" attribute of the second "img" tag is added to the background image designated by the "src" attribute of the second "img" tag, and an image in which the character string of the "alt" attribute of the third "img" tag is added to the background image designated by the "src" attribute of the third "img" tag.

(Eighth Variation)

Furthermore, this preferred embodiment was explained with the image parameter designating the additional information and the background information and the image server generating an image in which characters or character strings expressed by additional information are added to a background image identified by the background information designated by the image parameter. However, this is intended to be illustrative and not limiting, for it would be fine for the image parameter to designate, besides the additional information and the background information, style information indicating a style or styles for adding characters or character strings expressed by that additional information to the image. In addition, it would be fine for the image server to add those characters or character strings to the image with a style or styles indicated by the style information designated by the image parameter. In particular, a style or styles for adding the characters or character strings to the image include one or more out of the font, font size, font color, thickness, presence of border and absence or presence of border of the characters or character strings. According to these configurations, the image parameter designates the additional information, the background information and the style information, so it is possible to match the style or styles of the characters or character strings added to the background image with the style or styles of background image. In particular, when the background image is an advertisement image, the style or styles of the characters or character strings added to the background image can be a style or styles, such as a style or styles matched to the style or styles of background image or differs from the style or styles from the style or styles of background image, that is/are easy for the user to confirm by sight to increase the appeal of advertisements more than in the past.

The preferred embodiment and the above-described multiple variations can be mutually combined. Naturally, it is possible to supply a terminal 100 provided in advance with configurations for realizing the functions according to the preferred embodiment, and by applying a program, it is also possible to cause an existing terminal to function as the terminal 100 according to the preferred embodiment. In other words, it is possible to cause an existing terminal to function as the terminal 100 according to the preferred embodiment by applying a program for causing the various functional components of the terminal 100 illustrated in the above-described preferred embodiment to be realized so as to be executable by a computer (CPU and/or the like) controlling the existing terminal.

Similarly, it is naturally possible to provide a configuration for realizing the functions according to the preferred embodiment as the image server 200 prepared in advance, and it is also possible to cause an existing image sever to function as the image server 200 according to the preferred embodiment by applying a program. In other words, it is possible to cause an existing image server to function as the image server 200 according to the preferred embodiment by applying a program for casing the various function components of the image server 200 illustrated by the above-described preferred embodiment so as to be executable by a computer (CPU and/or the like) controlling the existing image server.

The method of distributing this kind of program is arbitrary, and for example distribution is possible by storing such on a recording medium such as a memory card, a CD-ROM, a DVD-ROM and/or the like, and distribution is also possible via a communication medium such as the Internet and/or the like. In addition, the browsing method according to the present invention can be implementing using the browsing system 1 according to the present invention.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

This application claims the benefit of Japanese Patent Application No. 2011-102524, filed on Apr. 28, 2011, the entire disclosure of which is incorporated by reference herein.

INDUSTRIAL APPLICABILITY

The present invention can be applied to a terminal for displaying images, an image server for transmitting images to a terminal, and a system provided with a terminal and an image server.

DESCRIPTION OF REFERENCE NUMERALS

1 Browsing system
10 Communication network
100 Terminal
100a CPU
100b ROM
100c RAM
100d Hard disk
100e Media controller
100f LAN card
100g Video card
100h LCD
100i Keyboard
100j Speaker
100k Touchpad
110 Document location information accepting part
120 Document request transmission part
130 Document response receiving part
150 Image location information extraction part
151 Additional information extraction part
152 Image location information generation part
153 Overwriting part
160 Image request transmission part
170 Image response receiving part
180 Document display part
200 Image server
210 Image storage
220 Image request receiving part
230 Image retrieving part
240 Image generation part 250 Image response transmission part
300 Document server
310 Document storage
320 Document request receiving part
330 Document retrieving part
340 Document response transmission part
400 Transformation server
410 Document request receiving part
420 Document location information extraction part
430 Document request transmission part
440 Document response receiving part
450 Transformation part
460 Document response transmission part

The invention claimed is:

1. A document server comprising a processor and for transmitting a document consisting of text only, wherein the document server is arranged to transmit the document to a terminal, and wherein the document contains or specifies a program executed before the terminal sends an image request based on image location information contained in the document to an image server in order for the terminal to request an image from the image server, for causing the terminal to function as:
   an additional information extractor that extracts from the document or from the program specified by that document, as additional information, characters or character strings that are to be overlaid as images on a background image, the characters or character strings being indicated at a position of a target for transformation by transformer;
   an image location information generator that generates image location information, wherein the image location information contains an image parameter that includes the extracted additional information and designates the background image, and wherein the additional information is overlaid as the images on the background image in an image generated by the image server;
   an over-writer that overwrites the image location information contained in the document with the image location information generated by the image location information generator; and
   an image request transmitter that transmits an image request to the image server in response to the document being loaded and the image location information being overwritten, and cause the image server to generate the image in response to receiving the image request, wherein the image request specifies the image parameter contained in the overwritten image location information,
   wherein the image server comprises:
   an image generator that generates, when the image designated by the image location information is requested by the terminal, the image in which the additional information designated by the image parameter contained in the image location information is overlaid as the images on the background image specified by the image parameter; and
   a transmitter that transmits the generated image to the terminal as response associated with the image request, and wherein:
   the image location information prior to being overwritten by the over-writer contains background information identifying the background image,
   the image location information generator generates the image location information containing the image parameter designating the background information contained in the image location information prior to being overwritten, and
   the image generator generates the image in which the additional information included in the image parameter contained in the image location information after being overwritten, is overlaid as the images on the background image identified by the background information.

2. The document server according to claim 1, wherein:
   the document is written in HTML (HyperText Markup Language);
   the image location information contained in the document is indicated by an src attribute of an img tag;
   the additional information associated with that image location information is indicated by an alt attribute of that img tag; and
   the additional information extractor extracts, as the additional information, the characters or the character strings specified by the alt attribute or text surrounded by quotation marks in the program.

3. The document server according to claim 2, wherein the program specified in the document is indicated by an onload attribute of a body tag.

4. The document server according to claim 1, wherein:
   the document is written in HTML (HyperText Markup Language);
   the image location information contained in the document is indicated by an src attribute of an img tag; and
   the additional information extractor extracts, as the additional information, text surrounded by tags having a class attribute or an id attribute associated with the img tag or text surrounded by quotation marks in the program.

5. The document server according to claim 4, wherein the program specified in the document is indicated by an onload attribute of a body tag.

6. The browsing system according to claim 1, wherein:
   style information indicating a style with which the characters or character strings specified by the additional information are overlaid as the images is described in the document or the program specified by the document;
   the image location information generator generates the image location information containing an image parameter designating the style information; and
   the image generator generates the image in which the additional information included in the image parameter is overlaid as the images on the background image designated by the image parameter, with the style designated by the image parameter.

7. The document server according to claim 1, wherein the document server is different from the image server.

8. The document server according to claim 1, wherein the terminal further functions as a display that displays the image generated by the image server in response to receiving the image from the image server.

9. A method executed by a document server for transmitting a document consisting of text only, including:
   a first transmission step wherein the document server is arranged to transmit the document to a terminal, and wherein the document contains or specifies a program, executed before the terminal sends an image request based on image location information contained in the document to an image server in order for the terminal to request an image from the image server, for causing the terminal to function as:

an additional information extractor that extracts from the document or from the program specified by that document, as additional information, characters or character strings that are to be overlaid as images on a background image, the characters or character strings being indicated at a position of a target for transformation by transformer;

an image location information generator that generates image location information, wherein the image location information contains an image parameter that includes the extracted additional information and designates the background image, and wherein the additional information is overlaid as the images on the background image in an image generated by the image server;

an over-writer that overwrites the image location information contained in the document with the image location information generated by the image location information generator; and an image request transmitter that transmits an image request to the image server in response to the document being loaded and the image location information being overwritten, and cause the image server to generate the image in response to receiving the image request, wherein the image request specifies the image parameter contained in the overwritten image location information, wherein the method is executed by a browsing system comprising the document server and the image server for transmitting the image to the terminal requesting the image designated by the image location information contained in the document, the browsing method, further including:

an image generation step in which the image server generates, when the image designated by the image location information is requested by the terminal, the image in which the additional information designated by the image parameter contained in the image location information is overlaid as the images on the background image specified by the image parameter; and a second transmission step in which the image server transmits the generated image to the terminal as response associated with the image request, wherein:

the image location information prior to being overwritten by the over-writer contains background information identifying the background image, the image location information generator generates the image location information containing the image parameter designating the background information contained in the image location information prior to being overwritten, and the image, in which the additional information included in the image parameter contained in the image location information after being overwritten, is overlaid as the images on the background image identified by the background information.

10. A non-transitory computer-readable recording medium on which is recorded a program executed by a computer terminal, before the terminal sends an image request based on image location information contained in a document consisting of text only to an image server in order for the terminal to request an image from the image server, the program being contained in or specified by the document and causing the terminal to function as:

an additional information extractor that extracts from the document or from the program specified by that document, as additional information, characters or character strings that are to be overlaid as images on a background image, the characters or character strings being indicated at a position of a target for transformation by transformer;

an image location information generator that generates image location information, wherein the image location information contains an image parameter that includes the extracted additional information and designates the background image, and wherein the additional information is overlaid as the images on the background image in an image generated by the image server;

an over-writer that overwrites the image location information contained in the document with the image location information generated by the image location information generator; and an image request transmitter that transmits an image request to the image server in response to the document being loaded and the image location information being overwritten, and cause the image server to generate the image in response to receiving the image request, wherein the image request specifies the image parameter contained in the overwritten image location information, wherein the image server comprises:

an image generator that generates, when the image designated by the image location information is requested by the terminal, the image in which the additional information designated by the image parameter contained in the image location information is overlaid as the images on the background image specified by the image parameter; and a transmitter that transmits the generated image to the terminal as response associated with the image request, and wherein:

the image location information prior to being overwritten by the over-writer contains background information identifying the background image, the image location information generator generates the image location information containing the image parameter designating the background information contained in the image location information prior to being overwritten, and the image generator generates the image in which the additional information included in the image parameter contained in the image location information after being overwritten, is overlaid as the images on the background image identified by the background information.

* * * * *